7725X

Sheet 1-3 Sheets.

J. Atwater.

Heating Stove.

Patented Aug. 23, 1833.

Sheet 2-3 Sheets.

7725X

J. Atwater.

Heating Stove.

Patented Aug. 23, 1833.

7725X

Sheet 3-3 Sheets.

J. Atwater.

Heating Stove.

Patented Aug. 23, 1833.

Fig's. 5 and 6 unavailable.

7725X

[illegible]

Aug. 23, 1833 219

James Atwater
Letters Patent

The Schedule referred to in these Letters Patent and making part
of the same containing a description in the words of the said
James Atwater himself of his improvement in Stoves for burn-
ing hard or anthracite coal called "Atwaters Combination Stove"
To all to whom these Presents shall come Greeting - -
Know ye that I James Atwater of New Haven in the County
of New Haven and State of Connecticut a citizen of said State
and of the United States - have invented, made, constructed and
brought into use a new and useful improvement in Stoves for burn-
ing hard or anthracite coal which I call "Atwaters combination
Stove" and which I specify and describe as follows - The objects which
I have sought to accomplish by means of my improvement are the fol-
lowing, 1st To be able to regulate the draught of the Stove and make
it stronger or weaker in degree and upward, downward, or horizontal
in direction. 2nd. To be able to kindle a small quantity of anthracite
coal and continue its combustion much longer than in common stoves
3d To be able to economize the heat after the fire is well kindled
by turning the draught through a sufficient quantity of pipe. and thus
transmitting the heat into the room. 4th To be able to clear the stove
of ashes and dust without the usual inconvenience of raising a dust
in the room, to the injury of the furniture. These objects & some others
not particularly mentioned I have accomplished by means of the
combination and arrangement of sundry separate parts. whether
these parts are new or old so as to form a new compound instrument.
which can be sufficiently described and understood by the following
explanations of the annexed drawings - Figure 1. is a front view of
a combination stove { a.a. represents a hollow cylinder with two doors
b. b. and a screen C. with [illegible] through which the fire can be seen
In this cylinder a, a, is placed a Grate for the coal constructed with
a back extending from the bottom of the Grate to the top of the cylinder
and

[illegible]

Figure 1:
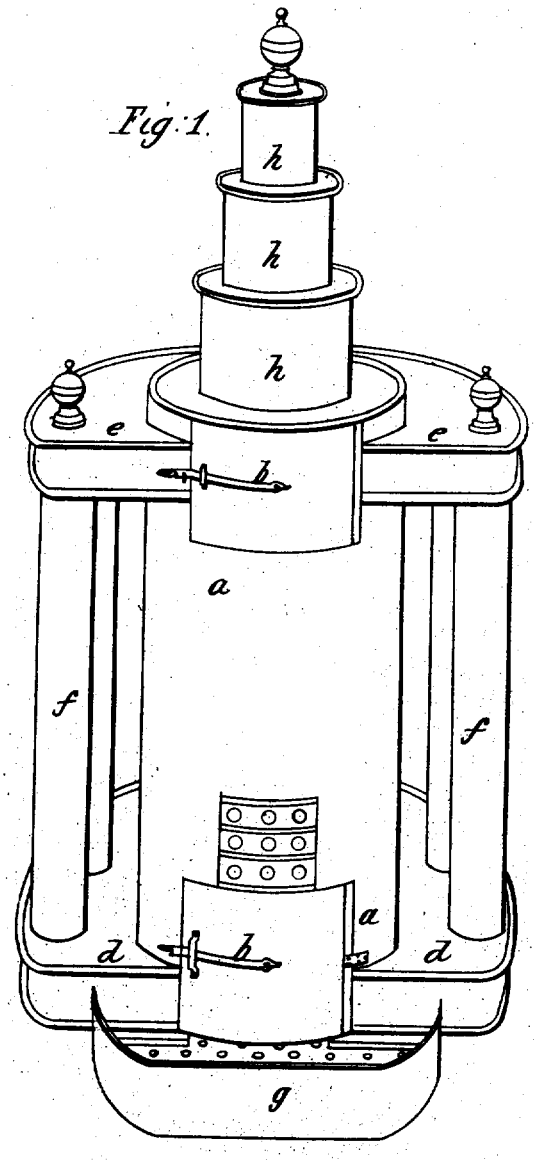
Figures 2, 3, 4:
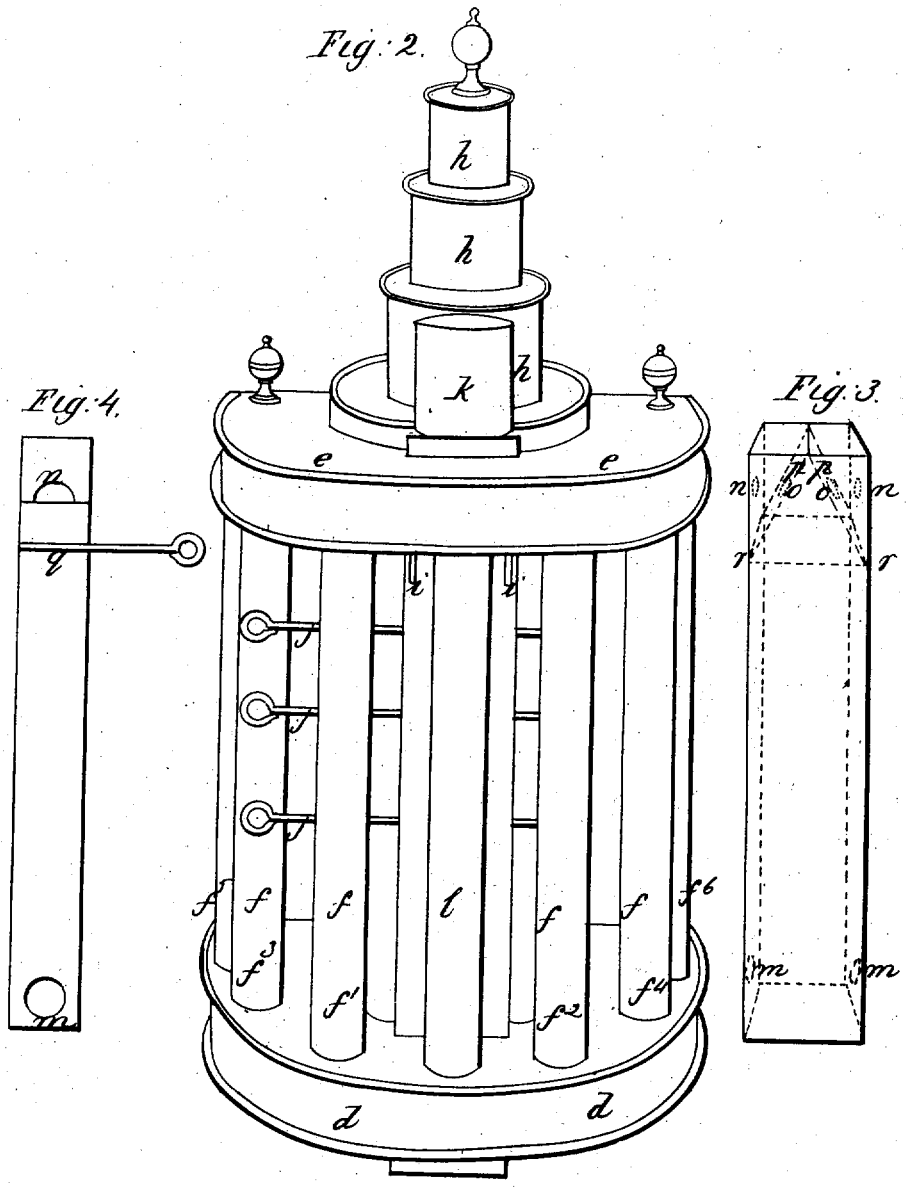

7725X Aug. 23, 1833 and with one or more openings in any part of the same regulated with
valves, slides or stoppers which can be opened and shut at pleasure,
when the three openings are used in the back it will be found best
to have one of those openings back of the fuel to be burned and the other
two near the top of the back, but as two openings will be found suffi-
cient for ordinary purposes; and in some instances only one may be
made to answer; it will generally be found best to have them as near
the top of the back as they can conveniently be. The back through which
the openings are made may be made from iron, brick or stone or any other
material which will sustain a high degree of heat. but iron will most
commonly be found preferable for that part of the back through which
the openings are and to which the valves, slides, & stoppers are to be attach
ed. d.d. is a hollow base and c.c. a hollow capital both of which
are connected with pipes or hollow columns; f.f. &c; g is a draw or pan
constructed in the usual manner and h.h. &c is an ornamental top.
Figure II. is a rear view of the same stove d.d. and c.c. represents the
hollow base and capital. h.h.h. the top as seen in figure 1; i.i. rep-
resents the chamber in the rear of the grate and hollow cylinder be-
fore mentioned; j.j.j. represents the rods which turn the valves which
regulate the flues; k. represents the pipe which finally conducts off
the smoke and heated air f.f.f.f. represents the pipes or columns through
which the heated air and smoke are made to pass either directly or af-
ter they have been made to pass through the pipes f.f. &c; l represents
a column which is not used as an air or smoke pipe but is added
for symmetry and strength. Figure III. is an interior view of the
chamber represented by ii. in fig 2. m.m. represents two openings
in the sides of the chamber through which the heated air and smoke
pass to the pipes f.1. & f.2. Fig 2.; Between each of the pipes f.1. & f.2.
& pipes f.3. & f.4. is a partition in the base d.d. Fig.2. which prevents
the hot air and smoke from passing on to pipes f.3 & f.4. and causes
it to ascend in pipes f.1. & f.2. to the capital c.c. fig.2. There is also a
partition in the capital c.c. fig 2 which prevents the hot air and smoke
from passing on to pipes f.5 & f.6. fig.2. and causes the same to descend
in in pipes f.3. & f.4. fig 2. to the base d.d. fig. 2. whence the same passes to
and ascends in the pipes f.5. & f.6. fig 2. to the capital c.c. fig. 2. and
thence off through the openings n.n. fig 3. and thence to the smoke pipe
k. fig 2. The hot air and smoke are made to pass in this direction through
the pipes by means of two valves which are so constructed and placed
as to close the openings O.O. in the two plates or partitions p.p. fig. 3.
and when these openings are closed the escape of hot air and smoke up
ward is prevented and they can only pass through the openings m.n.
fig 3. and thence through the pipes as already described. Figure (IV)
shows one of the openings m. & n. in fig 3. and one of the valves q. when it
is in the position to close the opening { o. fig 3. } If the valves are so pla-
ced as to turn at the angles r.r. fig 3. they will if fully turned close the
openings m, n. fig 3. whereas they now stop the openings o. o. fig 3. and
then the smoke and hot air will pass off freely through the openings o.o.
fig 2. into the smoke pipe k. fig 3. the handle of the valve q projects a
short distance behind the chamber i, i, fig 2. The hollow cylinder.
the pipes, the base and capital, the top & the pan may be made of
any suitable materials. but there is none perhaps better than sheet
iron for ordinary use. The cylinder should be lined with soap stone,
or fire brick, or cast iron. But cast iron for that part of the back
through which the flues or openings are made will generally be found
best. and soap stone or fire brick for the rest of the lining. The size of the
stove and its parts should vary according to the size of the room, Hall.
or church which is to be warmed. Figure V. is a front view of a com-
bination stove in a form convenient to be used in a fire place or other
position and can be made at less expense and to answer for all ordina-
ry purposes as the objects sought in this invention are as fully accom-
plished as when the colonnade of pipes and the base the capital & the top
as seen fig 1. and the handles, or rods of the valves q. fig 4. in the rear of the
stove as seen s.s. fig 2. are used as already described. The pan or [illegible]
g. and the two doors b.b. are the same as seen in fig 1. except the upper
door is placed a little lower in fig 5. than in fig 1. in order to make
room for the handles of the slides. valves or stoppers. one of which is to turn the 7725x Aug. 23, 1833

Figure 7:
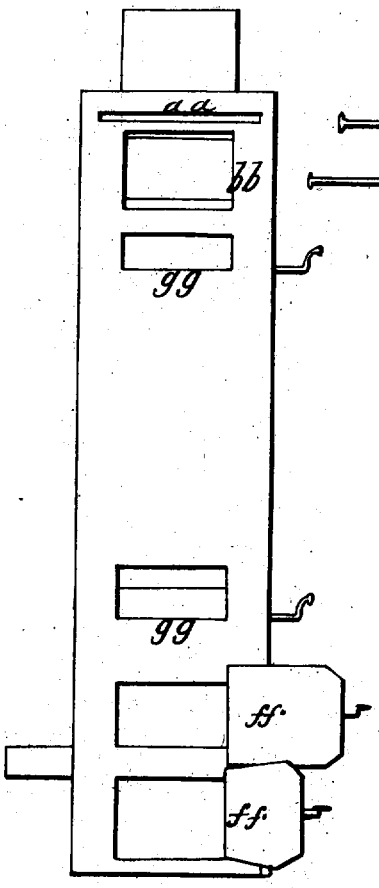
Figure 8:
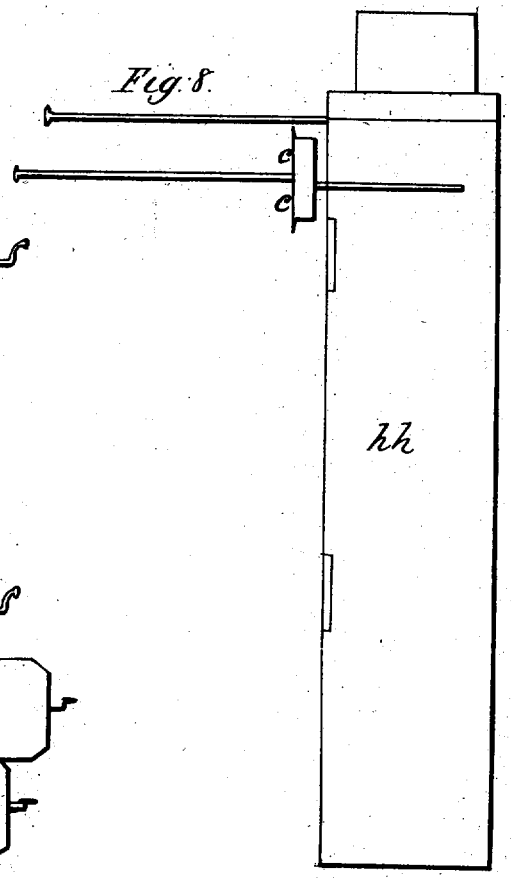
Figure 9:
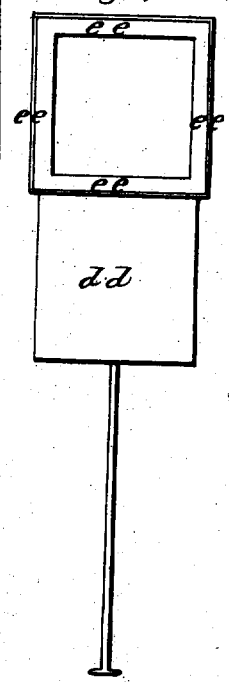

[illegible]

the draught through the pipes or permit it to pass off directly into the chim-
ney and the other to regulate the draught both of which handles are to be
brought out in front above the stove. The door C in front of the grate is
represented open & the front of the grate is so formed as to open and thus
to make it convenient to clean the grate of coal or fire at pleasure. more
or less pipe may be used by turns up and down (see drawing) or any other
form may here be given to the pipes or a pipe according to the taste or fan-
cy of the manufacturer and the space to be occupied by the stove until
the heat shall have been nearly all of it transmitted into the room and
it may then be conducted off direct into the chimney by separate flues
or brought back into any part of the chamber or smoke pipe above the
slide which turns the draught as may be found most convenient.
when a stove is to be set in a fire place the throat of the chimney should
be carefully closed, so that no air escapes through it which does not pass
through the stove or its pipes. Fig VI – is a side view of the same stove
in which the chamber is exhibited with one of its openings m. for the
passage of hot air and smoke into the pipes. also the handles v,v, to
close the flues and their bearings w, w, and notches x.x. to keep them
fast when closed and the handles y. z. to the slides or stoppers next
to be mentioned are exhibited in this figure. The upper slide or stopper
y. is fitted to pass through the back of the cylinder and into the cham-
ber in the rear by means of an opening a.a. which is represented in
Figure VII. This slide is nearly large enough in width & length
to close the chamber entirely when the slide is pushed back and then
the smoke and heated air must pass downward and through the
chamber and through the opening at m. fig 6. into the pipe and
through the pipe into the draught which leads off the smoke. The
other upper opening b.b, seen in figure 7. is a flue to which is
fitted a stopper or slide to regulate the same and this stopper or
slide is seen in fig VIII. – C.C. as it appears when withdrawn from
the opening in the cylinder and in the chamber. The upper slide
or stopper y. as seen in the drawings is placed above all the flues
in the back. it may however be placed between the two upper
flues flue when so required. Figure IX is a view of a horizontal section of
the chamber as seen from above when the slide d.d. which turns the
air and smoke through the pipes is drawn out so as to leave a direct
communication into the chimney or other out let for smoke and dust.
The section of the chamber is contracted a little by means of the projections
ee, ee, ee upon which the slide rests when it is pushed in and
closes the chamber. In figure 7. there are two doors ff. ff. near the bot-
tom of the chamber. the lower one being placed as low as possible to make
it convenient to remove ashes and dust which collect at the bottom
of the chamber. The upper one can be used as a flue when the other flues
are all stopped. and the draught will thus be turned downward
through the bottom of the grate gg. gg. in fig 7. denotes two flues in the
back of the stove opening into the chamber already described and seen
in fig 8. k.k. which flues are regulated by valves and moved by the
handles u, u. in fig 6. a stand or frame for the stove to rest on
and a pan for ashes & coal. to be placed near the stove in front will be
found useful. they may be made from such materials & in such form
& size as shall be most convenient. I claim as my invention the
combination and arrangement by which the separate parts are adapted
to each other and formed into one compound instrument to accomplish
the four objects enumerated at the commencement of this specifica-
tion which separate parts so combined are the following (viz) 1st a
cylinder, prismatic or furnace stove with one or more openings in any
part of the back thereof regulated with one or more valves, slides or stop-
pers, which can be opened and shut at pleasure. 2nd an air and dust
chamber in the rear of the back of the grate or stove into which the flues
open with two or more outlets for heated air and smoke and one or more
doors at the bottom below the grate to remove dust and ventilate the room
and assist if necessary to regulate the draught 3rd a set or collection
of one or more pipes in any form, but so arranged as to be connected with
the air chamber for the retention and diffusion of heat through the
pipes into the room. 4th a set of one or more valves, slides or stoppers
by which the draught is made to pass through the pipes or to draw or away 7725x Aug. 23, 1833

[illegible]

directly off in the usual way). And I do not claim any of the separate
parts separately taken or any of the particular portions of the separate
parts in this Patent as my invention. but the combination and
arrangement of all the parts whether the parts are new or old to form
a whole compound instrument as aforesaid. In testimony that
the foregoing is a true Specification of my said improvement as above
described I have hereunto set my hand and seal this 22nd day of
July A.D. 1833.

Witnesses
Saml. S. Hitchcock
Chas. A. Ingersoll
[illegible]

James Atwater

2565

(Dr in portfolio)